(12) United States Patent
Baldwin (10) Patent No.: US 7,968,794 B1
(45) Date of Patent: Jun. 28, 2011

(54) TWO LID HORIZONTAL AND VERTICAL MOUNTABLE ELECTRICAL DEVICE COVER

(75) Inventor: Jeffrey P. Baldwin, Phoenix, AZ (US)

(73) Assignee: TayMac Corporation, Gilbert, AZ (US)

( * ) Notice: Subject to any disclaimer, the term of this patent is extended or adjusted under 35 U.S.C. 154(b) by 374 days.

(21) Appl. No.: 12/211,066

(22) Filed: Sep. 15, 2008

Related U.S. Application Data (63) Continuation-in-part of application No. 11/093,458, filed on Mar. 29, 2005, now Pat. No. 7,462,778.

(60) Provisional application No. 60/972,338, filed on Sep. 14, 2007.

(51) Int. Cl.
*H05K 5/03* (2006.01)

(52) U.S. Cl. ............. 174/67; 174/66; 220/241; 220/242

(58) Field of Classification Search .................... 174/66, 174/67, 50, 53, 57, 58, 480, 481; 220/3.2–3.9, 220/4.02, 241, 242; D8/350, 353; 200/333; 439/536
See application file for complete search history.

(56) References Cited

U.S. PATENT DOCUMENTS

| | | |
|---|---|---|
| 1,952,719 A | 3/1934 | Lewin |
| 2,526,606 A | 10/1950 | Gregg |
| 2,916,733 A | 12/1959 | Hirsch |
| 3,252,611 A | 5/1966 | Weitzman et al. |
| 3,432,611 A | 3/1969 | Gaines et al. |
| 3,437,738 A | 4/1969 | Wagner |
| 3,438,534 A | 4/1969 | Zerwes |
| 3,491,327 A | 1/1970 | Tait et al. |
| 3,518,356 A | 6/1970 | Friedman |
| 3,530,230 A | 9/1970 | Cormier et al. |
| 3,544,703 A | 12/1970 | Jones |
| 3,654,663 A * | 4/1972 | Algotsson ...................... 220/3.8 |
| 3,716,815 A | 2/1973 | Riches |
| 3,895,179 A | 7/1975 | Wyatt |
| 3,965,287 A | 6/1976 | Mueller |
| 4,032,030 A | 6/1977 | Bass et al. |
| 4,197,959 A | 4/1980 | Kramer |
| 4,342,493 A | 8/1982 | Grenell |
| 4,381,063 A | 4/1983 | Leong |
| 4,424,407 A | 1/1984 | Barbic |
| 4,500,746 A | 2/1985 | Meehan |
| 4,705,335 A | 11/1987 | Goebel |
| 4,737,599 A | 4/1988 | Fontaine |
| 4,757,908 A | 7/1988 | Medlin, Sr. |
| 4,833,277 A | 5/1989 | Jacoby, Jr. et al. |
| 4,844,275 A | 7/1989 | Schnell et al. |
| 4,874,906 A | 10/1989 | Shotey |
| 4,979,634 A | 12/1990 | Begley |
| 4,998,635 A | 3/1991 | Vink et al. |
| 5,072,848 A | 12/1991 | Pipis et al. |
| 5,148,348 A * | 9/1992 | White .............................. 174/67 |
| 5,174,773 A | 12/1992 | Jones |
| 5,178,350 A | 1/1993 | Vink et al. |
| 5,218,169 A | 6/1993 | Riceman |
| 5,228,584 A | 7/1993 | Williams, Jr. |

(Continued)

*Primary Examiner* — Angel R Estrada
(74) *Attorney, Agent, or Firm* — Booth Udall, PLC (57) ABSTRACT

Particular implementations of electrical outlet cover comprise a base comprising a first opening allowing access to the electrical outlet, a first cover comprising a second opening allowing access to the electrical outlet, and a second cover covering the second opening. In particular implementations, the first cover and second cover have opening axes substantially perpendicular to each other. The second cover may be a flat cover or a while in use cover, and in particular implementations the first and second covers may be biased closed.

20 Claims, 10 Drawing Sheets

U.S. PATENT DOCUMENTS

| | | | |
|---|---|---|---|
| 5,280,135 A | 1/1994 | Berlin | |
| 5,317,108 A | 5/1994 | Prairie, Jr. | |
| 5,362,924 A | 11/1994 | Correnti | |
| 5,430,253 A | 7/1995 | Pratt | |
| 5,456,377 A | 10/1995 | Williams, Jr. | |
| 5,527,993 A | 6/1996 | Shotey et al. | |
| 5,533,637 A | 7/1996 | Williams, Jr. | |
| 5,763,831 A | 6/1998 | Shotey et al. | |
| 6,133,531 A * | 10/2000 | Hayduke et al. | 174/67 |
| 6,160,219 A | 12/2000 | Maltby et al. | |
| 6,265,662 B1 * | 7/2001 | Riedy et al. | 174/67 |
| 6,476,321 B1 | 11/2002 | Shotey et al. | |
| 6,700,063 B2 | 3/2004 | Shotey et al. | |
| 6,806,426 B1 * | 10/2004 | Gretz | 174/67 |
| 6,891,104 B2 | 5/2005 | Dinh | |
| 7,049,516 B1 * | 5/2006 | Haag et al. | 174/66 |
| 7,097,474 B1 | 8/2006 | Naylor | |
| 7,129,413 B1 | 10/2006 | Rao et al. | |
| 7,276,662 B2 * | 10/2007 | Drane | 174/66 |
| 7,381,895 B1 | 6/2008 | Shotey et al. | |
| 7,396,997 B2 * | 7/2008 | Dinh | 174/67 |
| 7,598,453 B1 * | 10/2009 | Shotey et al. | 174/66 |
| 7,619,162 B2 * | 11/2009 | Dinh et al. | 174/58 |

* cited by examiner

FIG. 14

TWO LID HORIZONTAL AND VERTICAL MOUNTABLE ELECTRICAL DEVICE COVER

CROSS-REFERENCE TO RELATED APPLICATIONS

This application claims priority to the earlier filed U.S. provisional patent application entitled "Double Horizontal and Vertical Cover," Ser. No. 60/972,338 filed Sep. 14, 2007, and is also a continuation in part of the U.S. patent application entitled "Horizontal and Vertical Mountable Weatherproof Cover Plate," Ser. No. 11/093,458 filed Mar. 29, 2005, the disclosures of which are hereby incorporated herein by reference.

BACKGROUND

1. Technical Field

This disclosure generally relates to covers for electrical devices, and more specifically relates to horizontal and vertical mountable electrical outlet covers.

2. Background Art

Electrical outlets and other electrical devices oftentimes benefit from covers to protect them from their environment. For instance weather, environmental elements, moisture, dirt, tampering by animals or people, bugs, structural damage and so forth, may present problems for electrical devices. To this end, some efforts have been put forth to create electrical device covers. Unfortunately, some device covers are not very easy to use, or are not very adaptable to different needs. As an example, some electrical devices are mounted in a vertical configuration while others are mounted in a horizontal configuration. Some electrical device covers, however, are only usable in a vertical configuration, or are only usable in a horizontal configuration. Additionally, some electrical device covers are inordinately bulky and clumsy in their operation.

SUMMARY

In an aspect, this document features a electrical outlet cover, comprising: a base comprising a first opening in a substantially planar front surface of the base, the first opening being large enough to receive a face of an electrical outlet through the opening, a first cover hingedly coupled to the base along a first axis and biased from an open position to a closed position, wherein in the closed position the first cover closes against the base. The first cover may comprise a substantially planar outer surface parallel to the substantially planar front surface of the base and facing away from the electrical outlet when the first cover is in its closed position, and a second opening through the first cover at least as large as and at least partially aligned with the first opening. The electrical device cover may further comprise a second cover hingedly coupled to the outer surface of the first cover along a second axis substantially perpendicular to the first axis and biased from an open position to a closed position, wherein in the closed position the second cover closes against the outer surface of the first cover.

Implementations may include one or more of the following: a base that further comprises a long edge and a short edge and the first axis is substantially parallel to the long edge; a largest diameter of the second cover that is smaller than a largest diameter of the first cover; a first cord port between the base and the first cover and a second cord port between the first cover and the second cover; and a second cover that is a while-in-use cover comprising a volume large enough for the second cover to be closed when an electrical outlet cord is plugged into the electrical outlet.

In another aspect, this document features an electrical outlet cover, comprising: a base comprising a first opening in a substantially planar front surface of the base, the first opening being large enough to receive a face of an electrical outlet through the opening; a first cover hingedly coupled to the base on the front surface of the base along a first axis, wherein the first cover is moveable between an open position and a closed position, wherein in the closed position the first cover closes against the base. The first cover may comprise an outer surface substantially parallel to the front surface of the base and facing away from the electrical outlet when the first cover is in its closed position and a second opening through the first cover at least as large as and at least partially aligned with the first opening. The second cover may be hingedly coupled to the first cover on the outer surface of the first cover along a second axis different from the first axis, wherein the second cover is moveable between an open position and a closed position, wherein in the closed position the second cover closes against the outer surface of the first cover.

Particular implementations may include one or more of the following: at least one of the first cover and the second cover is biased to its respective closed position by a biasing mechanism; the base may further comprise a long edge and a short edge and the first axis is substantially parallel to the long edge; a largest diameter of the second cover in its closed position is smaller than a largest diameter of the first cover in its closed position; a first cord port between the base and the first cover and a second cord port between the first cover and the second cover; second cover that is a while-in-use cover comprising a volume large enough for the second cover to be closed when an electrical outlet cord is plugged into the electrical outlet.

In yet another aspect, this document features an electrical outlet cover, comprising: a substantially planar base comprising at least one box mounting screw aperture extending through the base and at least one electrical outlet opening large enough to receive a face of an electrical outlet through the opening; a first cover hingedly mounted to a front surface of the base along a first axis; and a second cover hingedly mounted to a front surface of the first cover along a second axis substantially perpendicular to the first axis; wherein pivotal movement of the first cover about the first axis pivots both the first cover and the second cover and pivotal movement of the second cover about the second axis pivots the second cover but not the first cover.

Particular implementations may include one or more of the following: the first cover and the second covers may each be biased to their respective closed positions by respective first and second biasing mechanisms; the base may further comprise a long edge and a short edge and the first axis is substantially parallel to the long edge; a largest diameter of the second cover in its closed position is smaller than a largest diameter of the first cover in its closed position; a first cord port between the base and the first cover and a second cord port between the first cover and the second cover; a first cord port that is on the first cover and a second cord port that is on the second cover; a second cover that is a while-in-use cover comprising a volume large enough for the second cover to be closed when an electrical outlet cord is plugged into the electrical outlet; a first cover comprising an opening therethrough and at least partially aligned with the first opening; and an opening through the first cover is configured large enough to expose the face of the electrical outlet received through the opening of the base.

The foregoing and other features and advantages of the invention will be apparent from the following more particular description of embodiments of the invention, as illustrated in the accompanying drawings.

BRIEF DESCRIPTION OF THE DRAWINGS

The present disclosure will hereinafter be described in conjunction with the appended drawings, where like designations denote like elements, and.

DESCRIPTION

Figure 7:
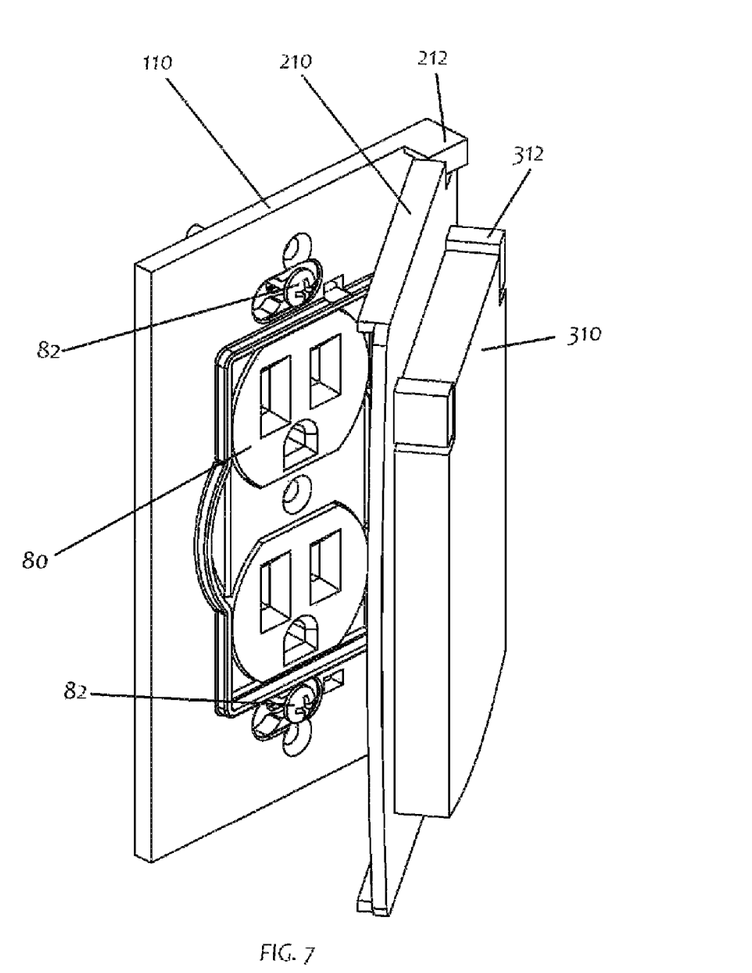
FIG. 7 is another perspective view of the electrical outlet cover of FIG. 1 with the first cover in an open position.
Figure 8:
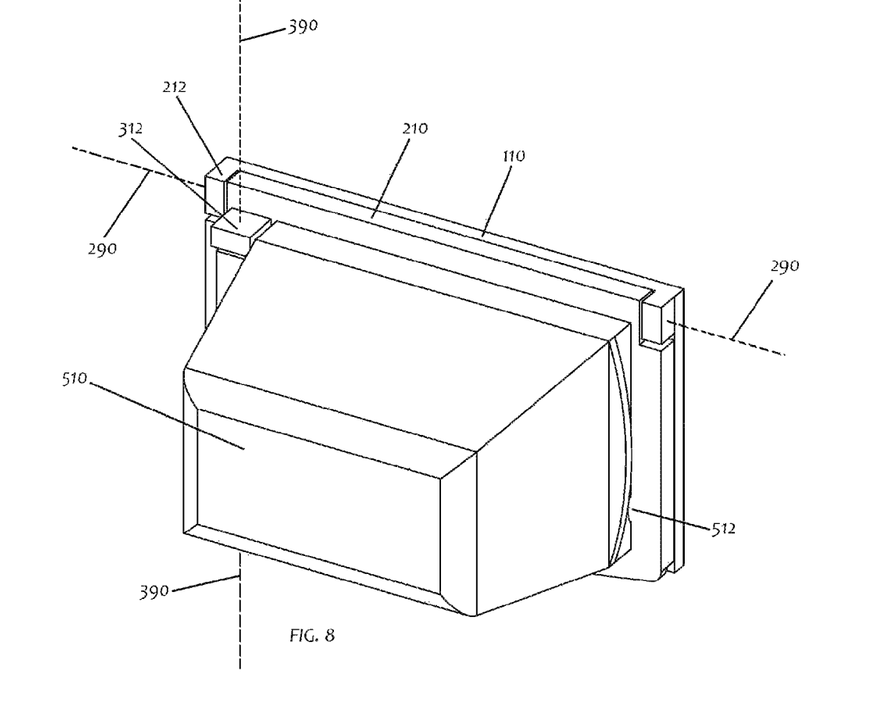
FIG. 8 is a perspective view of another implementation of a electrical outlet cover positioned in a horizontal configuration.
Figure 9:
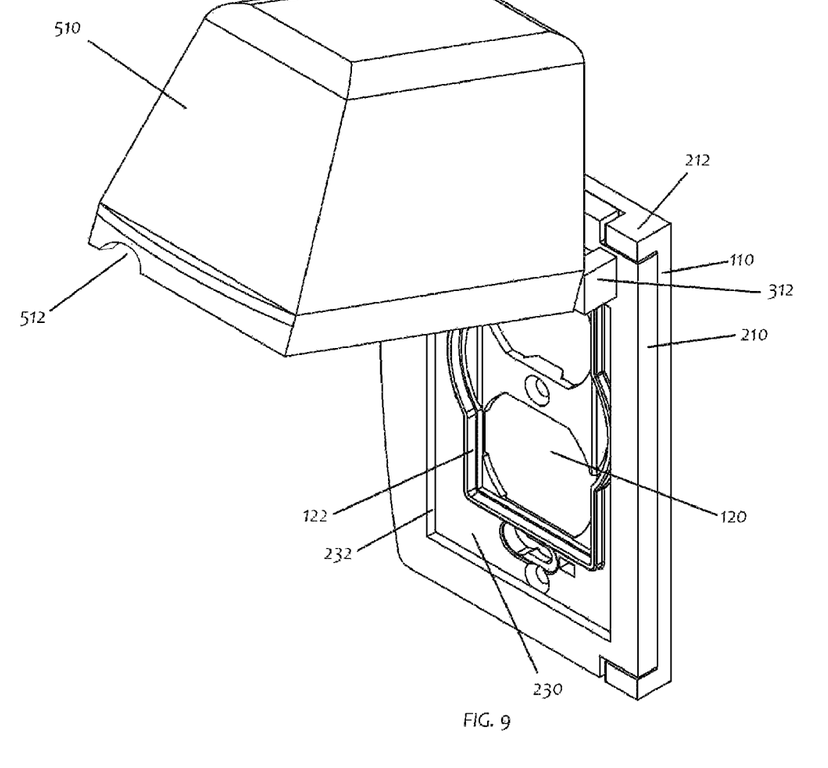
FIG. 9 is a perspective view of the electrical outlet cover of FIG. 8 positioned in a vertical configuration and with the second cover in an open position.

Referring now to the figures, the electrical outlet cover comprises a base 110 configured to couple to one of an electrical outlet 80 (FIG. 7) and an object proximate an electrical outlet, such as an electrical outlet mounting box. While reference is made to electrical outlet covers in relation to particular implementations disclosed herein, it will be understood that such references are intended to similarly apply to other electrical devices such as switches and other electrical devices used outdoors.

The electrical outlet 80 (FIG. 7) may be configured in any of a variety of configurations. For example, and without limitation, the electrical outlet 80 may comprise a power socket, an electrical outlet such as a standard or GFCI or any other format, and any other type of electrical outlet.

The object proximate to the electrical outlet 80 may comprise various items, such as a wall, a ceiling, or a floor in a house, an outcropping or island (such as a kitchen island) in a house, another structure in a house, a portion of a vehicle, a portion of a machine, an electrical outlet mounting box or any other item. The object proximate to the electrical outlet 80 is intended to encompass a broad array of items including anything that an electrical outlet 80 may be located on or proximate to. Where reference is made in the specification to coupling to the electrical outlet 80, it will be understood that this reference is intended to include the situation where the electrical cover is coupled to an object proximate the electrical outlet 80.

With reference specifically to the particular implementation of a base 110 illustrated in all of the figures for each of the implementations illustrated, the base 110 may comprise a coupler 112 (FIG. 2) to allow it to couple to the electrical outlet 80. The coupler 112 of the implementation illustrated in FIG. 2 comprises a screw hole whereby a screw 82 (FIG. 7) is attached to the electrical outlet 80 or object proximate to the electrical outlet 80. The coupler 112 alternatively could comprise any other coupling mechanism, such as an adhesive, a friction fit, a slot, a gravity based connection, a hinge, a joint, a link, a mount, a pin, a pivot, a rest, an elbow, and so forth.

The base 110 comprises a first opening 120 configured to allow access to the electrical outlet 80. This can be seen in the embodiments in FIGS. 2 and 9. The first opening 120 is defined by an inner edge 122. The embodiment of FIG. 2 comprises two first openings 120 configured to allow access to a standard electrical outlet, with a coupler 112 positioned on a portion of the base 110 residing between the two first openings 120. In alternative embodiments, the base 110 may comprise only one first opening 120 that allows access to an electrical outlet, such as for use with a GCFI outlet or a round outlet. The first opening 120 may be of various sizes and configurations, depending on the desired uses and does not necessarily need to be sized or shaped to match the size or shape of the electrical device face extending into the opening. For instance, the base 110 may be configured and sized for use with a double gang, triple gang, quadruple gang, and so forth. The base 110 may also be configured for use with an industrial sized outlet, or any other electrical device. The first opening 120 may therefore be sized and shaped according to these various situations to allow access to the electrical outlet 80. Additionally, the base may be configured to accept adapters to convert a particular opening size and/or shape to a different size and/or shape. As illustrated in FIGS. 2, 4, 9 and 10, removable tab portions may also be included to convert the base from a configuration for use with a first type of electrical device to a base configured for use with a second type of electrical device different from the first type.

The base 110 may also comprise any thickness and the first opening 120 may also comprise any thickness, accordingly. Although the base 110 in the accompanying figures generally comprise a rectangular shape, the base 110 could also be round, square, polygonal, and so forth.

In one particular implementation, the base 110 may comprise an adaptable plate comprising removable or punch-out portions allowing it to adapt to various types of electrical outlets 80. For instance the adaptable plate may be adaptable to receive a standard outlet, or a GCFI outlet, and so forth, according to the portions of the adaptable plate that are selectively punched out or removed. As such, the base 110 may be manufactured such that the first opening 120 is not formed until the user punches out or removes certain portions of the adaptable plate.

The electrical outlet cover illustrated in all of the Figures comprises a first cover 210 configured to pivotally couple to the front, substantially planar surface of base 110. The phrase "moveably couple" and any variations thereof are meant to convey the idea that the first cover 210 may be moved between an open and a closed position relative to the base 110 while the first cover 210 remains coupled to the base 110. A portion of a back of the first cover 210 may abut against the base 110 when the first cover 210 is in a closed position. For instance a back of the first cover 210 may be substantially flat and may abut, in particular implementations, for substantially its entire perimeter, the base 110 when the first cover 210 is in a closed position. In an open position the first cover 210 may only contact the base 110 at the location of the coupling mechanism.

The first cover 210, like the base 110, may comprise any shape, size, thickness, or configuration depending on the desired application. The first cover 210 may be moveably coupled to the base 110 using any coupling mechanism. For instance a coupler 212 may be used, which may comprise a hinge, a slot, a joint, a link, a mount, a pin, a pivot, a rest, an elbow, and so forth.

The first cover 210 comprises an outer surface 220 configured to face away from the electrical outlet 80 when the first cover 210 is in a closed position. The outer surface 220 may be flat or textured and may comprise any shape or size. The outer surface 220 may be configured to be substantially parallel with the first opening 120 when the first cover 210 is in a closed position.

The first cover 210 comprises a second opening 230 configured to allow access to the electrical outlet 80 through the first opening 120 when the first cover 210 is in the closed position. The second opening 230 is defined by an inner edge 232. The second opening 230 may also be configured to allow access to the electrical outlet 80 through the first opening 120 when the first cover 210 is in an open position. The second opening 230 may comprise more than one second opening 230, similar to the first opening 120, and may be configured such that the second opening(s) 230 is substantially or at least partially aligned with the first opening(s) 120. The second opening 230 may be of various sizes, shapes, and configurations, depending on the desired uses, similar to the first opening 120.

The electrical outlet cover is configured to allow access to the electrical outlet 80 through the first opening 120 when the first cover 210 is in an open position. See, by non-limiting example, the particular implementations represented by FIGS. 7 and 10 where the first cover 210 is open and the electrical outlet 80 is accessible.

With reference to the particular implementation shown in FIGS. 1-7, the electrical outlet cover comprises a second cover 310 configured to openably couple to the first cover 210 at the outer face 220. The second cover 310 may couple to the first cover 210 at the outer face 220 using any mechanism, such as a coupler 312. The coupler 312 may comprise any of the same elements described above with respect to the coupler 212.

A portion of a back of the second cover 310 may abut against the first cover 210 when the second cover 310 is in a closed position. For instance, a back of the second cover 310 may be substantially flat and may substantially abut throughout its entire periphery the first cover 210 when the second cover 310 is in a closed position. In an open position the second cover 310 may only contact the first cover 210 at the location of the coupling mechanism.

The second cover 310 is configured to substantially cover the second opening 230 when the second cover 310 is in a closed position. This may help to hinder access to the electrical outlet by persons or animals, bugs, dirt, moisture, rain, and other environmental conditions. The electrical outlet cover is configured to allow access to the electrical outlet 80 through the second opening 230 and the first opening 120 when the second cover 310 is in an open position. For example, when the first cover 210 is closed, the second cover 310 may be opened and the second opening 230, first opening 120, and electrical outlet 80 may all be aligned or at least partially aligned. Thus, the opening the second cover 310 may allow access to the electrical outlet 80 through the second opening 230 and first opening 120.

With reference to the particular implementation shown in FIGS. 8-14, the electrical outlet cover comprises second cover 510 configured to moveably couple to the first cover 210 at the outer face 220. The second cover 510 is similar to second cover 310 (FIGS. 1-7) except that the second cover 510 comprises a volume and in particular embodiments a cord port 512 accessible by opening the second cover 510. The volume within the second cover 510 and the cord port 512 may allow a plug to remain plugged into the electrical outlet 80 and a cord extending from the plug to exit the electrical outlet cover through the cord port 512 with the electrical outlet cover in a fully closed position. This style of cover is conventionally called a while-in-use cover.

The volume within the second cover 512 is a voluminous enclosure in a portion of the second cover 510 facing the electrical outlet 80 when the electrical outlet cover is in a fully closed position. The cord port 512 may be located in the first cover 210, or in the second cover 510, or both. For instance the cord port 512 could comprise a hole in the first cover 210 that allows the cord to exit when the second cover 510 is closed. Likewise the cord port 512 could comprise a hole in the second cover 510, or the cord port 512 could comprise a partial hole in the first cover 210 and a partial hole in the first cover 210 that together comprise a hole when the electrical outlet cover is in a fully closed position—thus allowing the cord to exit the cord port 512. This allows the electrical outlet 80 to be used while in the fully closed position.

In one embodiment the second cover 510 comprises a volume, similar to that described above, and the electrical outlet cover further comprises a cord port 514 accessible by opening the first cover 210; the volume and cord port 514 allowing a plug to remain plugged into the electrical outlet 80 and a cord extending from the plug to exit the electrical outlet cover through the cord port 514 with the electrical outlet cover in a fully closed position. This cord port 514 may be located in the base 110, or in the first cover 210, or both, similar to the cord port 512 described above with relation to the first cover 210 and second cover 510. Cord ports 512 and 514 are both visible in FIGS. 10 and 13.

Figure 10:
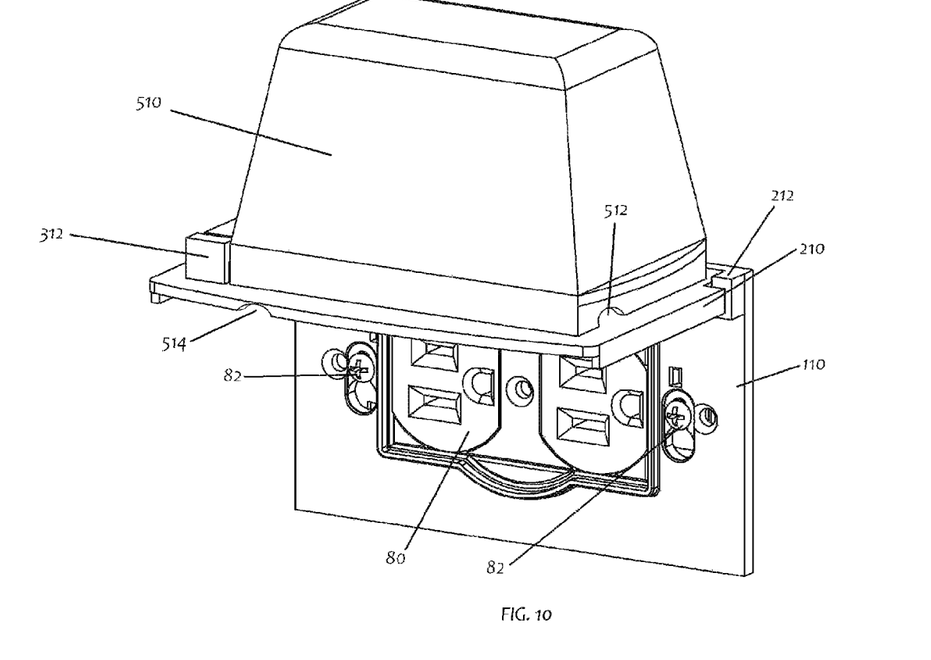
FIG. 10 is the electrical outlet cover of FIG. 8 connected to an electrical device and with the first cover in an open position.
Figure 11:
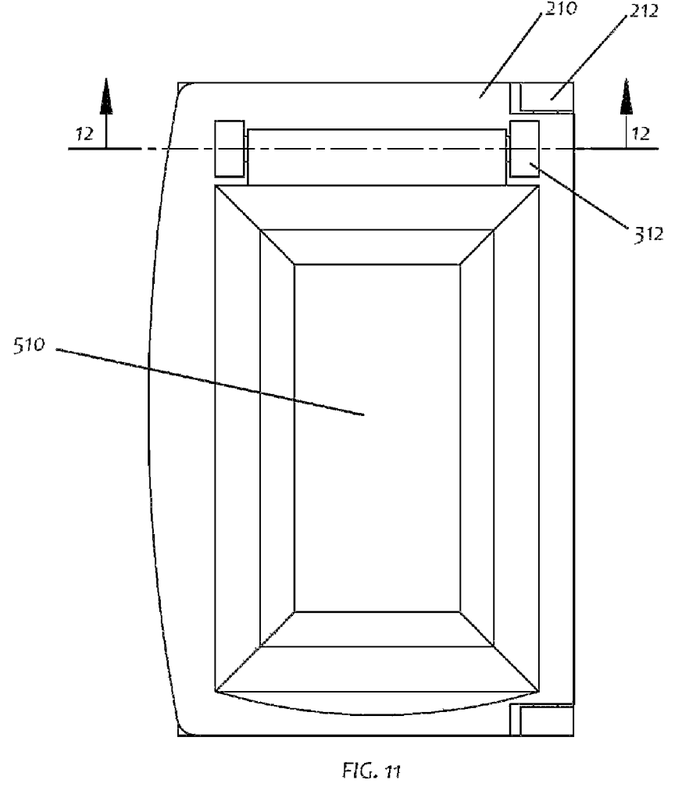
FIG. 11 is a front view of the electrical outlet cover of FIG. 8.
Figure 12:
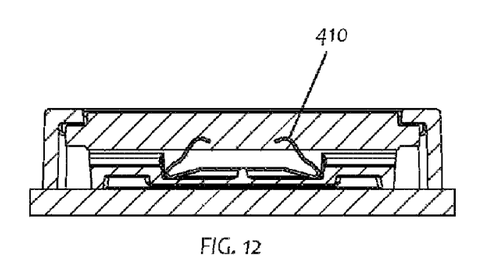
FIG. 12 is a cross section view of the electrical outlet cover of FIG. 11 taken along section line 12-12.
Figure 13:
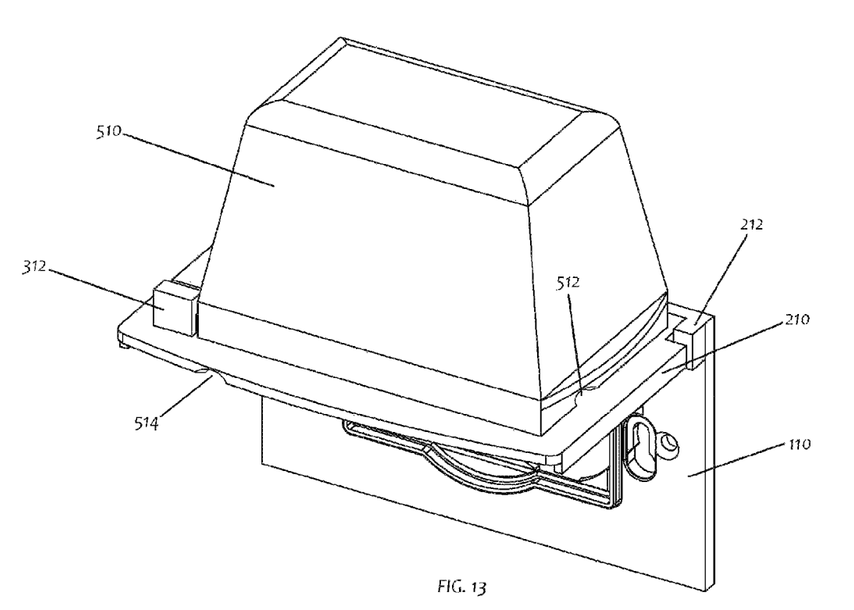
FIG. 13 is the electrical outlet cover of FIG. 10 unconnected to an electrical device.
Figure 14:
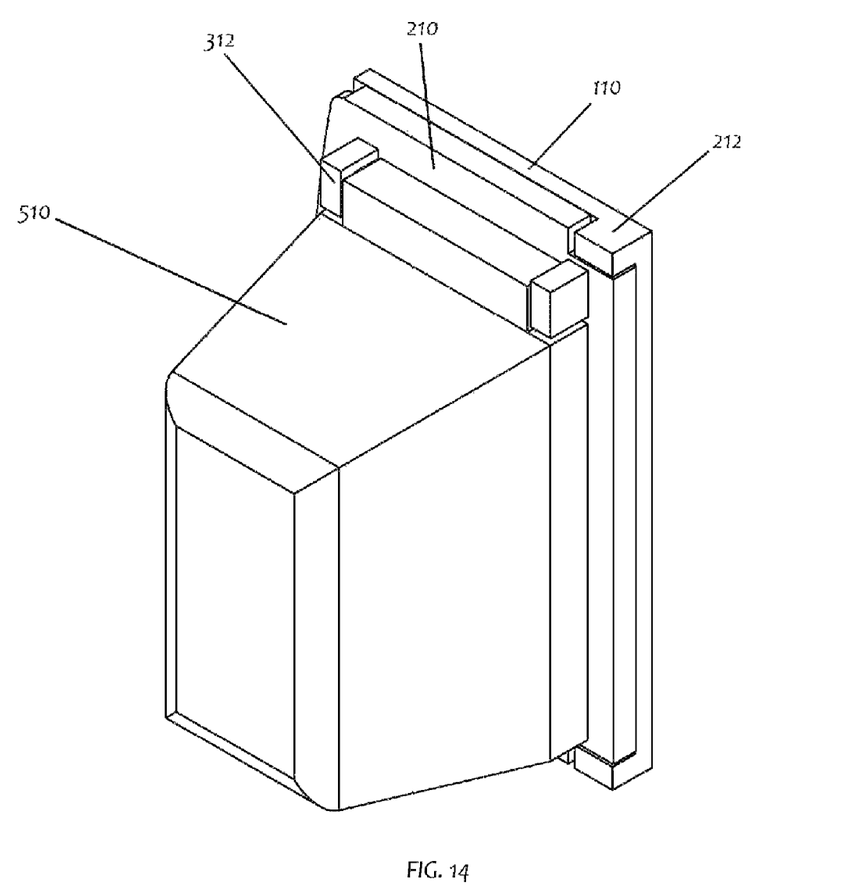
FIG. 14 is the electrical outlet cover of FIG. 8 positioned in a vertical configuration.

With particular reference to the opening axes illustrated in FIGS. 1, 2, 4, 7, 8, 9, 10 and 13. The first cover 210 comprises a first opening axis 290. The first opening axis 290 is that axis upon which the first cover 210 opens and closes relative to the base 110. The second cover 310 or 510 comprises an opening axis 390, which is that axis upon which the second cover 310 or 510 opens and closes relative to the first cover 210. The opening axes 290 and 390 may be offset from one another by some angle, or they could be aligned with one another. In one particular embodiment, the coupler 212 comprises a hinge and the coupler 312 also comprises a hinge, and the opening axes of the hinges are offset from one another by an angle of about ninety degrees, or are substantially perpendicular to each other. Thus in FIG. 2 it can be seen that when the electrical outlet cover is positioned in a vertical configuration the second cover 310 will open in an upwards vertical direction, while in FIG. 7 it can be seen that in the same embodiment the first cover 210 will open laterally to the side. In FIG. 10, it can be seen that when the electrical outlet cover of this particular embodiment is positioned in a vertical orientation the second cover 510 will open in an upwards vertical direction, while in FIG. 13 it can be seen that in the same embodiment the first cover 210 will open laterally to the side.

In one embodiment the base 110 comprises a first long edge 130 and a first short edge 140 and the first cover 210 is coupled to the base 110 at least one of adjacent to and on the first long edge 130. This can be seen in FIGS. 1 and 8, where the coupler 212 is located adjacent to the first long edge 130 of the base 110.

Figure 5:
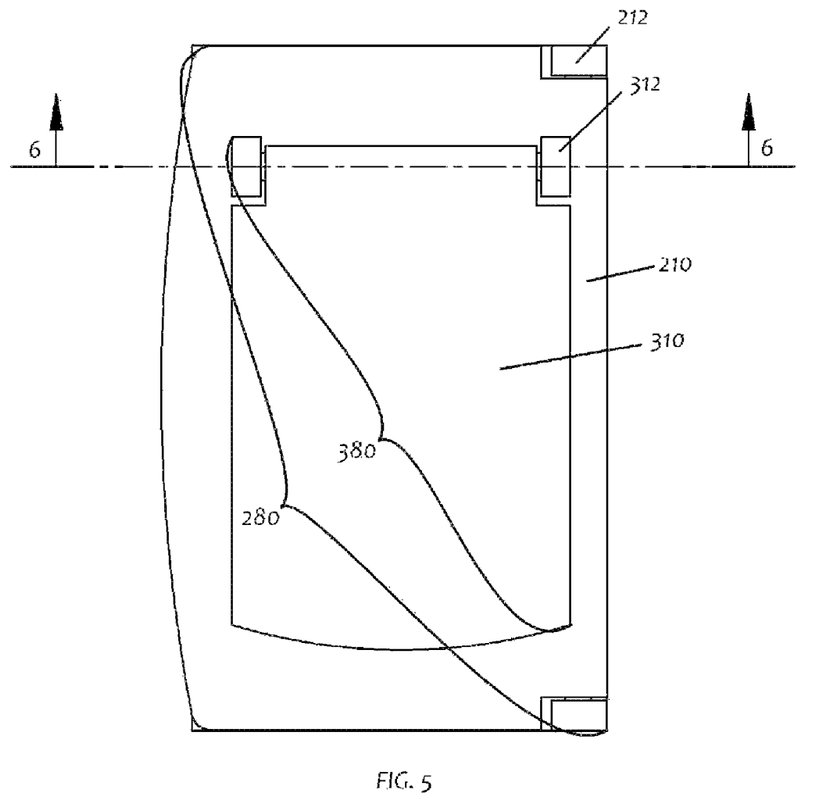
FIG. 5 is a front view of the electrical outlet cover of FIG. 1.
Figure 6:
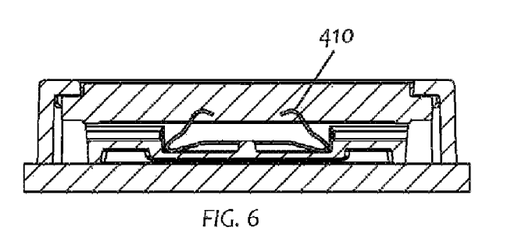
FIG. 6 is a cross section view of the electrical outlet cover of FIG. 5 taken along section line 6-6.

In particular implementations, such as that illustrated in FIG. 5, a largest diameter 380 of the second cover 310 is smaller than a largest diameter 280 of the first cover 210—both diameters being measured parallel to the first opening 120 when the electrical outlet cover is in a fully closed position. The definition of "diameter" herein is not confined to a limited meaning applied only to a circular, cylindrical, or spherical object, but "diameter" is instead herein defined broadly as the length of a straight line segment passing through the center of a body and terminating at the periphery. In another embodiment, a largest diameter of the second cover 510 is smaller than a largest diameter of the first cover 210 (see FIG. 11).

In various embodiments the first cover 210 and/or second cover 310 or 510 are biased closed by one of gravity and a biasing mechanism 410. The biasing mechanism 410 may comprise a leaf spring, such as that shown in FIGS. 6 and 12. The biasing mechanism 410 may comprise any other element such as a coil spring, a magnet, a vacuum bias, an elastic element, and so forth. The electrical outlet cover may comprise a biasing mechanism 410 acting on the first cover 210 to bias the first cover 210 closed, a biasing mechanism 410 acting on the second cover 310 or 510 to bias the second cover 310 or 510 closed, or neither, or both. The electrical outlet cover could also comprise a biasing mechanism 410 that biases the first and/or second cover 310 or 510 open. Biasing mechanisms and particularly biasing mechanisms for used with biased hinges are known in the art and any known biasing mechanism that may be configured for the particular cover implementations described herein are suitable.

Figure 1:
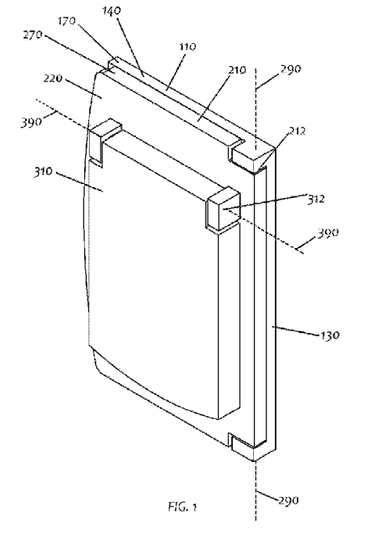
FIG. 1 is a perspective view of an implementation of an electrical outlet cover positioned in a vertical configuration.
Figure 2:
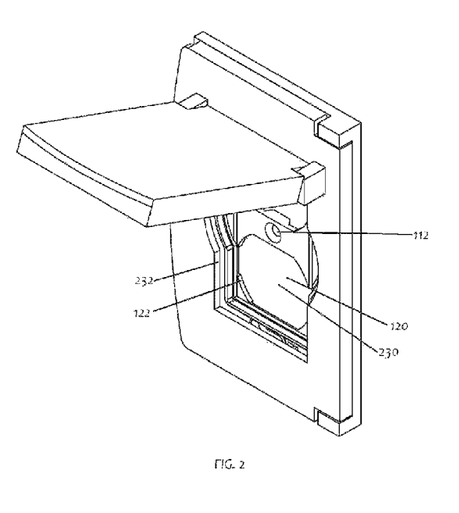
FIG. 2 is the electrical outlet cover of FIG. 1 with the second cover in an open position.
Figures 3, 4:
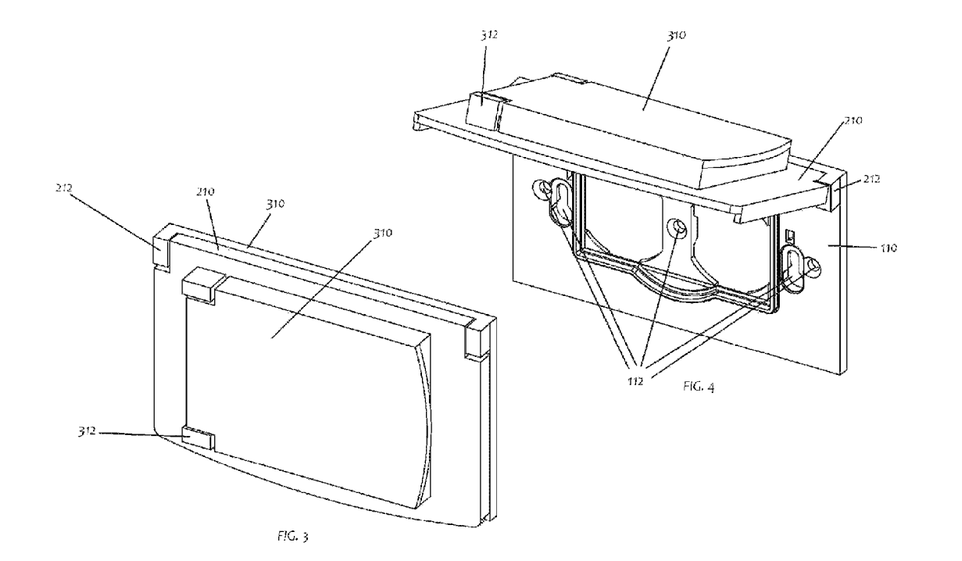
FIG. 3 is the electrical outlet cover of FIG. 1 positioned in a horizontal configuration.
FIG. 4 is the electrical outlet cover of FIG. 3 with the second cover in an open position.

By non-limiting example, the second cover 310 of the embodiment of FIG. 2 allows the device to be biased closed by gravity when the device is in a vertical position. Likewise, the first cover 210 of the same embodiment, as depicted in FIG. 4, allows the device to be biased closed by gravity when the device is mounted in a horizontal configuration. Inclusion of a biasing mechanism does not preclude closure by gravity biasing, but inclusion of a specific biasing mechanism may allow the cover to close even without the assistance of gravity biasing.

In one particular embodiment, the base 110 comprises an outer edge 170 and the first cover 210 comprises an outer edge 270, and the outer edge 170 and outer edge 270 are substantially flush with one another.

The electrical outlet cover is in a fully closed position when the base 110 is coupled to an electrical outlet 80, the first cover 210 is in a closed position, and the second cover 310 or 510 is in a closed position. FIGS. 1, 3, 8 and 14 illustrate embodiments in fully closed positions.

Particular implementations of electrical outlet covers disclosed in this application may be used in conjunction with a method of protecting an electrical outlet 80, comprising: providing a base 110 configured to couple to an electrical outlet 80, the base 110 comprising a first opening 120 configured to allow access to the electrical outlet 80; moveably coupling a first cover 210 to the base 110, the first cover 210 comprising: an outer face 220 configured to face away from the electrical outlet 80 when the first cover 210 is in a closed position; and a second opening 230 configured to allow access to the electrical outlet 80 through the first opening 120 when the first cover 210 is in the closed position; wherein the electrical outlet cover is configured to allow access to the electrical outlet 80 through the first opening 120 when the first cover 210 is in an open position; and openably coupling a second cover 310 or 510 to the first cover 210 at the outer face 220, the second cover 310 or 510 being configured to substantially cover the second opening 230 when in a closed position, wherein the electrical outlet cover is configured to allow access to the electrical outlet 80 through the second opening 230 and the first opening 120 when the second cover 310 or 510 is in an open position.

In one embodiment, the step of openably coupling a first cover 210 to the base 110 comprises hingeably coupling the first cover 210 to the base 110. In one embodiment the step of openably coupling a second cover 310 or 510 to the first cover 210 at the outer face 220 comprises hingeably coupling the second cover 310 or 510 to the first cover 210 at the outer face 220. In one embodiment the steps of openably coupling a first cover 210 to the base 110 and openably coupling a second cover 310 or 510 to the first cover 210 at the outer face 220 further comprise openably coupling the first cover 210 to the base 110 and openably coupling the second cover 310 or 510 to the first cover 210 at the outer face 220 such that an opening axis 290 of the first cover 210 and an opening axis 390 of the second cover 310 or 510 are offset from one another by an angle of about ninety degrees. In various other embodiments the offset could be any other angle lying between zero and 360 degrees. In various embodiments the method further comprises the step of biasing one of the first cover 210 and the second cover 310 or 510 to a closed position with one of gravity and a biasing mechanism 410.

The method of providing protection for an electrical outlet 80 may further comprise various other steps, such as: installing the base 110 to at least one of an electrical outlet 80 and an object proximate an electrical outlet 80; punching out at least one removable part in a plate of the base 110 to configure the base 110 for operation with a specific electrical outlet 80; and so forth.

The foregoing and other features and advantages that may be achieved will be apparent from the following more particular description of embodiments of the invention, as illustrated in the accompanying drawings.

From this disclosure, the implementations listed here, and many others, will become readily apparent to those of ordinary skill in the art. Those of ordinary skill in the art will readily understand the versatility with which this disclosure may be applied.

Implementations of a electrical outlet cover, and implementing components, may be constructed of a wide variety of materials known in the art for constructing electrical outlet covers. For example, the components may be formed of: metals; polymers such as thermoplastics (such as ABS, Fluoropolymers, Polyacetal, Polyamide; Polycarbonate, Polyethylene, Polysulfone, and/or the like); thermosets (such as Epoxy, Phenolic Resin, Polyimide, Polyurethane, Silicone, and/or the like), any combination thereof, and/or other like materials. Those of ordinary skill in the art will readily be able to select appropriate materials and manufacture these products from the disclosures provided herein.

Some components defining an electrical outlet cover may be manufactured simultaneously and integrally joined with one another, while other components may be pre-manufactured or manufactured separately and then assembled with the integral components. Various implementations may be manufactured using conventional procedures as added to and improved upon through the principles described here. Components manufactured separately may then be coupled or removably coupled with the other integral components in any manner.

It will be understood that implementations are not limited to the specific components disclosed herein, as virtually any components consistent with the intended operation of a method and/or system implementation for an electrical outlet cover may be utilized. Accordingly, for example, although particular component examples may be disclosed, such components may comprise any shape, size, style, type, model, version, class, grade, measurement, concentration, material, weight, quantity, and/or the like consistent with the intended operation of a method and/or system implementation for a electrical outlet cover.

In places where the description above refers to particular implementations of an electrical outlet cover, it should be readily apparent that a number of modifications may be made without departing from the spirit thereof. The presently disclosed implementations are, therefore, to be considered in all respects as illustrative and not restrictive.

The invention claimed is:

1. An electrical outlet cover, comprising:
a base comprising a first opening in a substantially planar front surface of the base, the first opening being large enough to receive a face of an electrical outlet through the opening;
a first cover hingedly coupled to the base along a first axis and biased from an open position to a closed position, wherein in the closed position the first cover closes against the base, the first cover comprising:
an substantially planar outer surface parallel to the substantially planar front surface of the base and facing away from the electrical outlet when the first cover is in its closed position; and
a second cover hingedly coupled to the outer surface of the first cover along a second axis substantially perpendicular to the first axis and biased from an open position to a closed position, wherein in the closed position the second cover closes against the outer surface of the first cover.

2. The electrical outlet cover of claim 1, wherein the base further comprises a long edge and a short edge and the first axis is substantially parallel to the long edge.

3. The electrical outlet cover of claim 1, wherein a largest diameter of the second cover in its closed position is smaller than a largest diameter of the first cover in its closed position.

4. The electrical outlet cover of claim 1, further comprising a first cord port between the base and the first cover and a second cord port between the first cover and the second cover.

5. The electrical outlet cover of claim 4, wherein the second cover is a while-in-use cover comprising a volume large enough for the second cover to be closed when an electrical outlet cord is plugged into the electrical outlet.

6. An electrical outlet cover, comprising:
a base comprising a first opening in a substantially planar front surface of the base, the first opening being large enough to receive a face of an electrical outlet through the opening;
a first cover hingedly coupled to the base on the front surface of the base along a first axis, wherein the first cover is moveable between an open position and a closed position, wherein in the closed position the first cover closes against the base, the first cover comprising:
an outer surface substantially parallel to the front surface of the base and facing away from the electrical outlet when the first cover is in its closed position; and
a second opening through the first cover at least as large as and at least partially aligned with the first opening; and
a second cover hingedly coupled to the first cover on the outer surface of the first cover along a second axis different from the first axis, wherein the second cover is moveable between an open position and a closed position, wherein in the closed position the second cover closes against the outer surface of the first cover.

7. The electrical outlet cover of claim 6, wherein at least one of the first cover and the second cover is biased to its respective closed position by a biasing mechanism.

8. The electrical outlet cover of claim 6, wherein the base further comprises a long edge and a short edge and the first axis is substantially parallel to the long edge.

9. The electrical outlet cover of claim 6, wherein a largest diameter of the second cover in its closed position is smaller than a largest diameter of the first cover in its closed position.

10. The electrical outlet cover of claim 6, further comprising a first cord port between the base and the first cover and a second cord port between the first cover and the second cover.

11. The electrical outlet cover of claim 10, wherein the second cover is a while-in-use cover comprising a volume large enough for the second cover to be closed when an electrical outlet cord is plugged into the electrical outlet.

12. An electrical outlet cover, comprising:
a substantially planar base comprising at least one box mounting screw aperture extending through the base and at least one electrical outlet opening large enough to receive a face of an electrical outlet through the opening;
a first cover hingedly mounted to a front surface of the base along a first axis; and
a second cover hingedly mounted to a front surface of the first cover along a second axis substantially perpendicular to the first axis;
wherein pivotal movement of the first cover about the first axis pivots both the first cover and the second cover and pivotal movement of the second cover about the second axis pivots the second cover but not the first cover.

13. The electrical outlet cover of claim 12, wherein the first cover and the second cover are each biased to their respective closed positions by respective first and second biasing mechanisms.

14. The electrical outlet cover of claim 12, wherein the base further comprises a long edge and a short edge and the first axis is substantially parallel to the long edge.

15. The electrical outlet cover of claim 12, wherein a largest diameter of the second cover in its closed position is smaller than a largest diameter of the first cover in its closed position.

16. The electrical outlet cover of claim 12, further comprising a first cord port between the base and the first cover and a second cord port between the first cover and the second cover.

17. The electrical outlet cover of claim 16, wherein the first cord port is on the first cover and the second cord port is on the second cover.

18. The electrical outlet cover of claim 16, wherein the second cover is a while-in-use cover comprising a volume large enough for the second cover to be closed when an electrical outlet cord is plugged into the electrical outlet.

19. The electrical outlet cover of claim 12, wherein the first cover comprises an opening therethrough and at least partially aligned with the first opening.

20. The electrical outlet cover of claim 19, wherein the opening through the first cover is configured large enough to expose the face of the electrical outlet received through the opening of the base.

* * * * *